Patented Oct. 27, 1953

2,657,241

UNITED STATES PATENT OFFICE 2,657,241

HEMIACETALS

George W. Mast, South Salem, and Floyd E. Anderson, Yonkers, N. Y., assignors to Nepera Chemical Co., Inc., Nepera Park, Yonkers, N. Y., a corporation of New York No Drawing. Application May 21, 1952, Serial No. 289,216

5 Claims. (Cl. 260—611)

This invention relates to certain novel hemiacetal compounds and relates more particularly to hemiacetals of chloral, i. e. trichloroacetaldehyde.

An object of this invention is the production of hemiacetals of chloral wherein the alcohol residue in said hemiacetal structure contains an unsaturated, acetylenic carbon to carbon linkage.

Another object of this invention is the production of hemiacetals of chloral which exhibit desirable hypnotic and sedative activity.

Other objects of this invention will appear from the following detailed description.

The novel compounds of our invention may be represented by the following general structural formula:

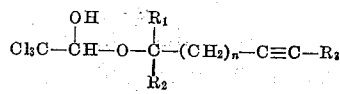

wherein $n$ is to 0 to 3, and $R_1$, $R_2$, and $R_3$ are members of the group consisting of hydrogen and saturated alkyl radicals having from 1 to 6 carbon atoms. Thus, for example, $R_1$, $R_2$, and $R_3$ may be the same or different and may be a methyl, ethyl, propyl, isopropyl, butyl, amyl or hexyl group. In the novel compounds of our invention, $R_1$ and $R_2$, taken together, may also comprise the carbon atoms necessary to form a saturated cycloaliphatic ring.

The novel compounds of our invention may be obtained by reacting chloral with a suitable acetylenic alcohol. In carrying out the reaction, it is preferable that anhydrous conditions be maintained during the reaction. Inert solvents such as petroleum ether, hexane or cyclohexane may be employed as a reaction medium. Reaction temperatures of 0° to 80° C. are satisfactory and the formation of the hemiacetal is usually completed after about 2 to 96 hours. In carrying out the condensation whereby our novel hemiacetals are formed, the reactants are preferably employed in about stoichiometric proportions. The novel chloral hemiacetals of our invention are solid, crystalline compounds, in general, but some are oily in nature.

To obtain the novel hemiacetals of our invention, chloral may be reacted with various acetylenic alcohols in the manner described above. As examples of suitable acetylenic alcohols which may be employed to form said hemiacetals there may be mentioned:

3-methyl-1-pentyne-3-ol
2-methyl-3-butyne-2-ol
Propargylalcohol
3-butyne-2-ol
3-methyl-1-pentyne-3-ol
3-butyne-1-ol
3-ethyl-1-pentyne-3-ol
2-heptyne-1-ol
3-heptyne-1-ol
2-octyne-1-ol
3-octyne-1-ol
2-nonyne-1-ol
3-nonyne-1-ol
3,4-dimethyl-1-pentyne-3-ol
3,4-dimethyl-1-hexyne-3-ol
3-isopropyl-4-methyl-1-pentyne-3-ol
3-isopropyl-1-hexyne-3-ol
1-nonyne-3-ol
3-methyl-1-nonyne-3-ol
1-methyl-2-octyne-1-ol and
1-methyl-1-ethyl-2-octyne-1-ol As is well known, acetal formation takes place at the carbonyl group of the aldehyde, the reaction resulting not only in the formation of a hydroxy group, but in the formation, as well, of an ether linkage between the carbon atom of the chloral carbonyl group and the carbon atom to which the hydroxy radical of the acetylenic alcohol is attached, yielding compounds of the structural formula given above. These compounds are useful therapeutically since they have desirable hypnotic and sedative action.

In order further to illustrate our invention, but without being limited thereto, the following examples are given:

Example I 105 parts by weight of 3-methyl-1-pentyne-3-ol and 158 parts by weight of anhydrous chloral are dissolved in about 330 parts by weight of petroleum ether and the solution warmed to a temperature of 100° C. for about 30 minutes. The reaction mixture is then cooled to a temperature of −5° C. for about 48 hours and a white crystalline precipitate of 3-methyl-1-pentyne-3-ol hemiacetal of chloral is obtained. This novel hemiacetal has a melting point of 62–62.5° C. The compound has the following formula:

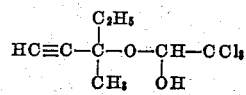

Example II 200 parts by weight of 2-methyl-3-butyn-2-ol and 350 parts by weight of chloral are placed together in a flask in about 525 parts by weight of petroleum ether and the reaction mixture left at room temperature for several hours. The flask is then refrigerated and after standing for about three days, a crystalline product is obtained. The crystals are filtered off, thoroughly washed with petroleum ether and then dried under vacuum. The melting point of the chloral hemiacetal of 2-methyl-3-butyn-2-ol thus obtained is 77–78° C. The yield is 83% of theory. This compound has the following formula:

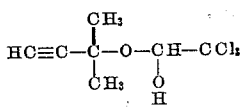

Example III 200 parts by weight of 1-ethynyl cyclohexanol and 237 parts by weight of chloral are placed together in about 525 parts by weight of petroleum ether and left at room temperature for several hours. This is then refrigerated. After three days, crystals are found to have separated from the reaction mixture. The crystals are filtered off and thoroughly washed with petroleum ether. The product is then dried under vacuum. The melting point is 52° C. A yield of 51% of theory is obtained. The formula of the compound obtained is:

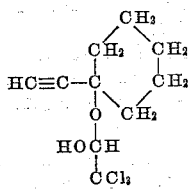

Example IV 200 parts by weight of 3-octyn-1-ol and 234 parts by weight of chloral are placed together in 525 parts by weight of petroleum ether. A warming is noted on mixing and the reaction mixture is left at room temperature for several hours. The mixture is then subjected to prolonged cooling at a temperature of −70° C. An oily product is obtained on removal of the petroleum ether. The oily product obtained consists of the chloral hemiacetal of 3-octyne-1-ol having the formula:

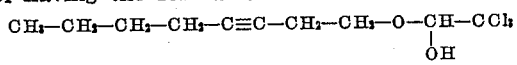

It is to be understood that the foregoing detailed description is given merely by way of illustration and that many variations may be made therein without departing from the spirit of our invention.

Having described our invention, what we desire to secure by Letters Patent is:

1. The hemiacetals of chloral of the following formula:

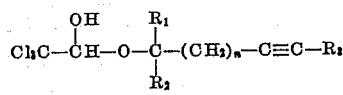

wherein $n$ is to 0 to 3, and $R_1$, $R_2$, and $R_3$ are members of the group consisting of H and alkyl radicals containing from one to six carbon atoms and $R_1$ and $R_2$, taken together, a cycloalkyl ring.

2. The novel hemiacetal of chloral having the formula:

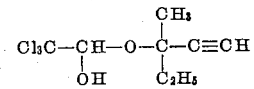

3. The novel hemiacetal of chloral having the formula:

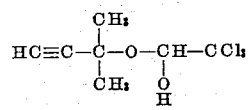

4. The novel hemiacetal of chloral having the formula:

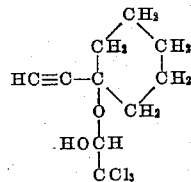

5. The novel hemiacetal of chloral having the formula:

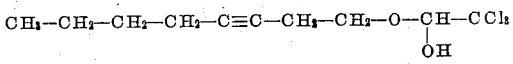

GEORGE W. MAST.
FLOYD E. ANDERSON.

References Cited in the file of this patent

Sumerford, Jour. Amer. Chem. Soc., vol. 70 (1948), page 448.